United States Patent
Weh et al.

(10) Patent No.: US 6,264,245 B1
(45) Date of Patent: Jul. 24, 2001

(54) CONNECTION ADAPTER FOR GAS BOTTLE VALVES

(75) Inventors: Wolfgang Weh; Erwin Weh, both of Illertissen (DE)

(73) Assignee: Weh GmbH, Verbindungstechnik, Illertissen (DE)

(*) Notice: Subject to any disclaimer, the term of this patent is extended or adjusted under 35 U.S.C. 154(b) by 0 days.

(21) Appl. No.: 09/308,097

(22) PCT Filed: Nov. 18, 1996

(86) PCT No.: PCT/EP97/06413

§ 371 Date: May 17, 1999

§ 102(e) Date: May 17, 1999

(87) PCT Pub. No.: WO98/22746

PCT Pub. Date: May 28, 1998

(30) Foreign Application Priority Data

Nov. 18, 1996 (DE) .......................................... 296 19 912 U

(51) Int. Cl.[7] .................................................. F17C 13/04
(52) U.S. Cl. ........................ 285/125.1; 285/197; 285/205
(58) Field of Search ................................. 285/125.1, 197, 285/198, 205, 194; 137/317

(56) References Cited

U.S. PATENT DOCUMENTS

| 3,606,390 | * | 9/1971 | Taylor . |
| 3,799,189 | * | 3/1974 | Christianson . |
| 5,261,705 | * | 11/1993 | Takahashi . |
| 5,282,493 | * | 2/1994 | Schwartz . |
| 5,582,223 | * | 12/1996 | Weh . |

FOREIGN PATENT DOCUMENTS

1042329 * 11/1954 (DE) .

* cited by examiner

*Primary Examiner*—Flemming Saether
(74) *Attorney, Agent, or Firm*—Knobbe, Martens, Olson & Bear, LLP

(57) ABSTRACT

A connection adapter designed for gas bottle valves has a clamp-like locking device. An actuating device moves a piston guide bushing axially relative to the locking device to move the bushing into a sealed position in which the bushing bears upon a complimentary shaped connecting element. The actuating device has a threaded sleeve inside which the piston guide bushing is centrally extended, the threaded sleeve and bushing being mounted so that rotation of the threaded sleeve moves the bushing axially without rotating the bushing. A non-rotating, sliding block may be interposed between an end of the bushing and the clamp mounting.

10 Claims, 1 Drawing Sheet

CONNECTION ADAPTER FOR GAS BOTTLE VALVES

FIELD OF INVENTION

The invention relates to a connection adaptor in particular for gas bottle valves with a clamp-like clamp mounting and a connecting piston bush which is axially moveable relative to the clamp mounting by means of an actuating device and which in its connected position bears upon a complementary connecting element forming a seal.

BACKGROUND OF THE INVENTION

A connection adaptor of this type in the form of a filling connection for gas bottle valves, especially acetylene bottles is known from DE-U-9115142. The filling connection comprises thereby a cylindrical housing which on one side has a filling inlet with a filing hose while on the opposite side of the housing there is formed a valve fixing mounting which has a lateral valve insertion opening into a receiving space. In plan view the clamp mounting has thereby the form of a retaining clamp so that the connection adaptor can be fixed to the valve at the side. In the region of the locking side there is hereby provided in addition an adjustment screw so that the size of the valve receiving space can be varied to accommodate the respectively available complementary connection.

Although this filling connection has fundamentally proved its worth, the construction is relatively demanding. This also applies to the actuating device with which the connecting piston bush is axially moveable and bears upon the complementary connection or the gas bottle valve in a closed position to form a seal. Thus, on the one hand an eccentric connection is described which is however relatively costly to produce and requires a lot of space. Furthermore, a compression disc-shaped actuating device is also described with which the filling connection can be detached or connected by manual axial pressure. The actuation hereby can be problematic however especially when hoses with fairly large diameters are connected with the result that the actuating device can no longer be used or only with an unfavourable hand position.

SUMMARY OF THE INVENTION

Consequently, the object underlying the invention is to improve a connection adaptor of the type mentioned at the beginning with respect to an easier operation and a simple construction. In addition, the connection adaptor should as far as possible be compact, flat-surfaced and easy to clean.

This object is achieved with a connection adaptor for gas bottle valves with a clamp-like clamp mounting and a connecting piston bushing which is axially moveable relative to the clamp mounting by means of an actuating device which in its connected position bears upon a complementary connecting element forming a seal. The actuating device is formed from a threaded sleeve through which the connecting piston bushing extends centrally.

Because of the design of the actuating device in the form of a threaded sleeve through which the connecting piston bush extends centrally, the connection adaptor can be realised with a minimum of components. Thus relative to the state of the art acknowledged at the beginning, the result is that only roughly half of the components are required. In addition, these are substantially simple turned parts so that the proposed connection adaptor can be produced very cheaply. In particular, hose connections which connect in a radial direction at the side can be dispensed with by means of the centrally guided-through fluid passage which is especially favourable if the complementary connection is accessible from only one direction. In addition, a deflection in the direction of flow is as a result avoided and the compact construction is aided.

In a preferred embodiment, the connecting piston bush is provided with a sliding-block-like twist-proof element so that as a result the piston guide bush and the removing/filling hose connected thereto is not affected in its torsional position, i.e. is not twisted since the connecting piston bush is mounted in a screw spindle and hence is guided axially. In addition, easy adjustment of the axial stroke of the connecting piston bush is possible with this twist-proof element. As a result, for example wear and tear of the sealing ring at the front end of the connecting piston bush can be compensated for also in a simple manner so that a secure sealing closure on the complementary connection is always guaranteed. In addition, simple fitting or replacing of the coding pins for various sorts of fluids is made possible as a result.

Further advantageous developments are the subject of the subclaims. In particular, it might be indicated that the screw bush surrounds the clamp mounting which is formed cylindrically towards the hose connection tightly so that in total the connection adaptor has a very compact, flat-surfaced and hence easy to clean outer form. This is particularly important for example for cleaning and sterilisation when used in hospitals.

DESCRIPTION OF THE DRAWINGS

Two embodiments given by way of example are explained and described in more detail with reference to the drawings which hereby show.

DETAILED DESCRIPTION

Figure 1:
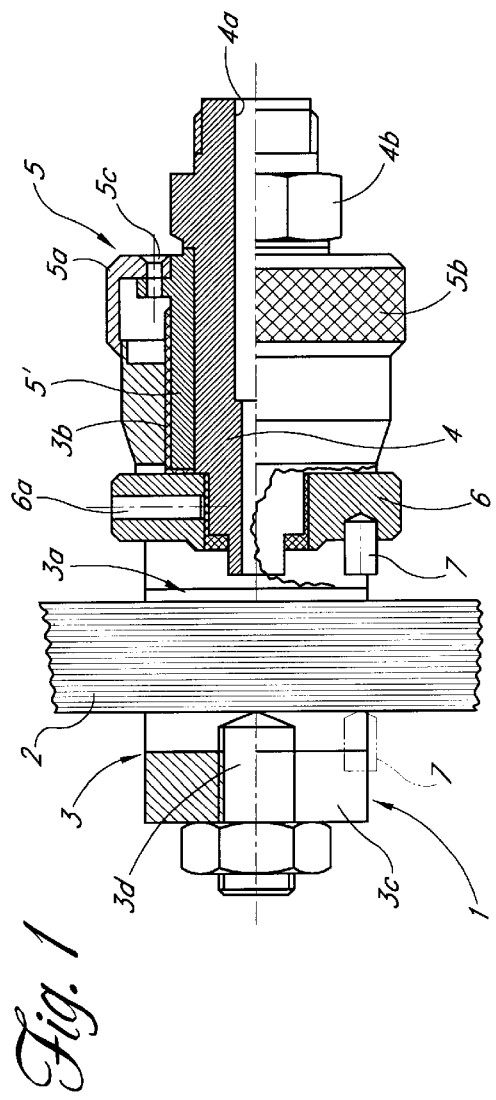
FIG. 1 a connection adaptor which bears upon a complementary connection but is not yet completely connected.

In FIG. 1, there is shown in side-view and in half-section a connection adaptor 1 which is to be connected to a complementary connection 2, shown only schematically here. This complementary connection 2, drawn in here in lines can be formed for example by means of a gas bottle valve which has a square exterior shape. The connection adaptor 1 has a clamp mounting 3 as an essential component which surrounds the complementary connection 2 in the shape of a clamp. In plan view, the embodiment of the clamp mounting 3 according to FIG. 1 would have an essentially C-shaped form in the shape of a screw clamp. Hence, the side of the connecting piston bush 3 pointing towards the observer is open so that the connection adaptor 1 can be put on here to the complementary connection 2 from the rear side in a simple manner, a locking clamp or locking side 3c being connected on the left and on the right the subsequently described components 4 to 6. According to the embodiment in FIG. 2 in the lower half, the complementary connection 2 can be surrounded on all sides also by the clamp mounting 3.

Figure 2:
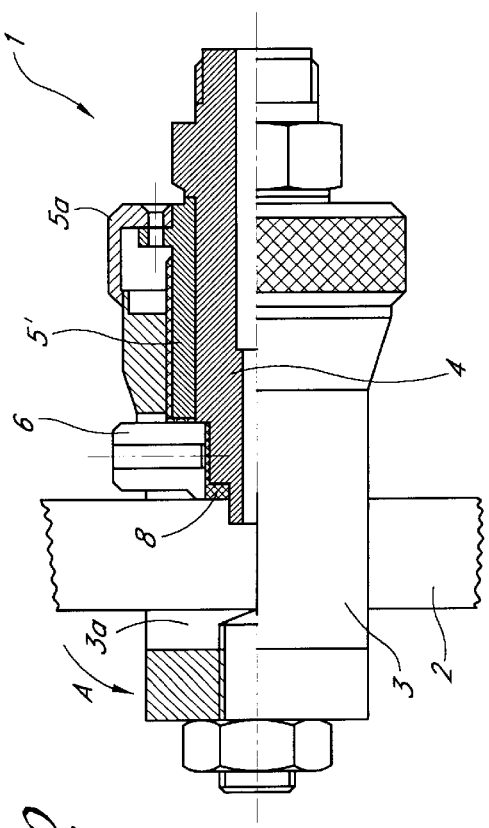
FIG. 2 the connection position of the connection adaptor according to FIG. 1, an alternative embodiment of the clamp mounting being illustrated in the lower half.

In the clamp mounting 3 on the right-hand side here, a connecting piston bush 4 is mounted to move axially with a centrally extending fluid passage 4a, the side of which pointing to the right here can be connected to a removal- or filling-hose while the end side of the connecting piston bush 4 pointing here to the left is, in its closed position (c.f. FIG. 2) to adjoin the complementary connection 2 to form a seal.

The axial movement of the connecting piston bush 4 is produced by means of an actuating device 5 in the form of a threaded bush 5a which is connected to a screw spindle 5' by means of a securing screw 5c so an to be twist-proof. The screw spindle 5' can be screwed in the clamp mounting 3 in an inner thread 3b so that the screw spindle 5' would move during the movement of the screw by means of the threaded bush 5a to the left here towards the receiving space 3a. In order to be able to be better controlled, the threaded bush 5a has knurling 5b on the outer circumference. The screw spindle 5' catches hereby, directly or via a flat sliding ring, a twist-proof element 6 which is moveable in the manner of a sliding block in the receiving space 3a of the clamp mounting 3. Since the twist-proof element 6 is screwed onto the connecting piston bush 4 and is secured against twisting by means of a radially extending attachment screw 6a, the connecting piston bush 4 is hence guided exactly therein and moved slot-like only in an axial direction, a twisting movement is excluded however. As a result, a twisting of the hose connected thereto is avoided.

Preferably, the sliding-block-like twist-proof element 6 has on the end side pointing towards the complementary connection 2 a coding or indexing pin 7 so that as a result specific identification is made possible between the connection adaptor 1 and the complementary connection 2. As a result, for example the danger of mixing up different gases taken from the complementary connection 2 is reduced. The indexing pin 7 configured in the so-called pin-index-construction can be provided hereby also on the opposite locking side 3c of the clamp mounting 3, as is shown in broken lines. On this locking clamp or locking side 3c of the clamp mounting 3 there is provided furthermore an adjustment screw 3d in the centre so that as a result the clearance width of the receiving space 3a of the clamp mounting 3 can be adjusted. It might be indicated that even the twist-proof element 6 can be adjusted by means of the attachment screw 6a in a certain range so that as a result, in co-operation with the adjustment screw 3d, a tight fitting of the connecting piston bush 4 to the complementary connection 2 respectively can be guaranteed.

In FIG. 2, the connection position of the connection adaptor 1 is shown in half-section. As is evident here from the upper half, the connecting piston bush 4 is displaced axially towards the complementary connection 2, in comparison with the attachment position shown in FIG. 1, and in fact by rotating the actuating device 5, namely the threaded bush 5a and the screw spindle 5'. As a result, the axial movement, shown here, of the screw spindle 5' and the threaded bush 5a relative to the exterior circumference of the clamp mounting 3 is produced. The twist-proof element 6 has also moved to the left together with the connecting piston bush 4 and indeed in the frame-like receiving space 3a of the clamp mounting 3, a security against twisting of the connecting piston bush 4 being achieved. In the position shown here, the connecting piston bush 4 adjoins the complementary connection 2 therefore together with the sealing ring 8 on the end side. The sealing ring 8 is hereby inserted for preference between the ring step, nearest the front, of the connecting piston bush 4 and the sliding-block-like twist-proof element 6. As a result, the sealing ring 8 is guided exactly.

Furthermore, it is evident when comparing FIGS. 1 and 2 that the inner side of the screw bush 5a slides along tightly to the exterior circumference of the cylindrically shaped clamp mounting 3 so that as a result dirt penetration into the actuating device 5 and the thread 3b on the screw spindle 5' is avoided. In addition, the connection adaptor 1 can be dismantled in a simple manner for example by loosening the attachment screw 6a, then by loosening the twist-proof element 6, for example the connecting piston bush 4 being rotated on a driver profile 4b, preferably on an exterior hexagon formed integrally thereto. In addition the securing screw 5c can also be unscrewed in a simple manner so that simple dismantling is made possible for cleaning or conversely simple favourably priced assembly during production.

In the lower half of the half-section according to FIG. 2, an alternative embodiment is shown, namely that the clamp mounting 3 is closed also on the side pointing towards the observer. In this case, for example the clamp mounting 3 could no longer be fixed on from the side but would have to be slipped on via the complementary connection 2 according to the arrow A. However since as a result greater security of the clamp mounting 3 results this frame-like closed construction can in many applications be advantageous in comparison with the screw clamp-shaped construction in FIG. 1.

What is claimed is:

1. A connection adapter for gas bottle valves having a clamp mounting, comprising a connecting piston bushing which is axially moveable relative to the clamp mounting by an actuating device to move the piston bushing between a connected position in which an end of the piston bushing is configured to bear upon a complementary connecting element to form a seal and an unconnected position in which there is no seal, the actuating device having a threaded sleeve through which the connecting piston bushing extends centrally to move the bushing between the connected and unconnected position, the connecting piston bushing being axially moveable in the clamp mounting with a twist-proof element, wherein between the connecting piston and the twist proof element there is provided a sealing ring on an end side of the twist-proof element configured for sealing with the complementary connection in the sealed position.

2. A connection adapter according to claim 1, wherein the twist-proof element is screwed onto the connecting piston bushing and secured against twisting.

3. A connection adapter according to claim 1, wherein the connecting piston bushing has a centrally and axially extending fluid passage extending through the bushing.

4. A connection adapter according to claims 1, wherein the bushing has an attached driver profile.

5. A connection adapter according to claim 4 wherein the driver profile is an external hexagon formed integrally with the bushing.

6. A connection adapter according to claim 1, wherein the threaded sleeve has knurling on an exterior circumference of the sleeve.

7. A connection adapter according to claim 1, wherein the clamp mounting has an adjustment screw on the locking clamp situated opposite the connecting piston bushing to adjust the tightness of the connection.

8. A connection adapter according to claim 1, wherein one of the clamp mounting and the non-rotating element have an indexing pin.

9. A connection adapter according to claim 1, wherein the end of the piston bushing extends through a hole in the twist proof element to form a seal when in the connected position such that the twist proof element and piston bushing move axially without rotating.

10. A connection adapter according to claim 1, wherein a ring seal is placed round the end piston bushing and between the twist-proof element and the mounting block to form a seal around the end of the piston bushing.

* * * * *